United States Patent [19]

Brunette

[11] Patent Number: 5,208,618
[45] Date of Patent: May 4, 1993

[54] APPARATUS FOR OBSERVING AND EXAMINING THE EYES

[76] Inventor: Michael D. Brunette, P.O. Box 25216, Honolulu, Hi. 96825

[21] Appl. No.: 654,836

[22] Filed: Feb. 13, 1991

Related U.S. Application Data

[63] Continuation of Ser. No. 457,180, Dec. 26, 1989, abandoned.

[51] Int. Cl.⁵ .............................. A61B 3/02; A61B 3/10
[52] U.S. Cl. .................................... 351/223; 362/83.1; 351/205
[58] Field of Search ............... 351/205, 223, 245, 246; 362/135, 136, 138, 139, 140, 141, 142, 157, 187, 188, 83.1, 74; 359/871, 602, 872

[56] References Cited

U.S. PATENT DOCUMENTS 4,241,383 12/1980 Shea .................................. 362/165
4,710,856 12/1987 Cheung .............................. 359/602

Primary Examiner—Rodney B. Bovernick

[57] ABSTRACT

A portable device for observing and examining the eyes, comprising a mirror hingeably mounted to the front bottom of a triangular-shaped base. Two lamps are attached, one at each side of the mirror. U shaped clips are affixed to the back bottom of the triangular-shaped base designed to slip over a horizontally extending automobile sun-visor and hold the mirror device in place. The portable device occupies the space between the sun-visor and vehicle ceiling and can be used by vehicle occupants easily, quickly, with minimal effort and without obstruction of occupant's views through the vehicle windows.

16 Claims, 3 Drawing Sheets

APPARATUS FOR OBSERVING AND EXAMINING THE EYES

This application is a continuation of Ser. No. 457,180, now abandoned, filed Dec. 26, 1989.

BACKGROUND OF INVENTION

1. Field of Invention

This invention relates to apparatus for observing and examining the eyes. More particularly, this invention relates to a portable illuminated mirror device designed for use inside motor vehicles.

2. Description of the Prior Art

The use of illuminated mirrors is well know and understood. The prior art illuminated mirrors include hand held mirrors, portable cosmetic mirrors and travel mirrors. See, e.g., Brush, U.S. Pat. No. 2,120,238; Shea, U.S. Pat. No. 4,241,383, and Dieterle, U.S. Pat. No. 4,745,528.

While convenient and self-contained, these prior art mirrors are not useful for close observation and examination of the eyes while inside motor vehicles. Illuminated mirrors normally require an alternating current source not available in a motor vehicle. Moreover, such illuminated mirrors employ diffuse, unfocussed light, or alternatively, bright glaring, light, neither of which promote the efficient examination of eyes in a motor vehicle. It is an object of the present invention to provide a self-illuminating mirror powered by a portable direct current energy source, employing lamps which direct focussed beams of light having variable strength.

Presently available automobile mirrors are of the variety which lie flat on the top of sun-visors. These prior art mirrors tend to be awkward, inconvenient and time consuming to operate. The housing of such mirrors are not suitable for mounting in a convenient position in the vehicle. Once mounted, they require a number of movements to extract them from the stored position for use. In addition, sun-visor mounted cosmetic mirrors obstruct the driver's view through the vehicle windshield while in use. It is a further object to this invention to provide an automobile mirror which employs a housing that mounts for convenient, effortless and immediate use and which can be used without obstructing the view through the vehicle windows.

SUMMARY OF THE INVENTION

These and other objects are accomplished in the present invention, a portable device for observing and examining the eyes comprising a mirror hingeably mounted to the front bottom of a triangular-shaped base. Two lamps are attached, one at each side of the mirror. U shaped clips are affixed to the back bottom of the triangular-shaped base designed to slip over an automobile sun visor and hold the mirror device in place.

The device is used by mounting the base on top of a horizontally extended automobile sun-visor such that the base fits in the space between the sun-visor and the ceiling of the vehicle. The U-shaped clips which are attached to the back bottom of the base slip over the windshield edge of the sun-visor and hold the mirror device firmly to the sun-visor.

The mirror, being hingeably mounted to the bottom front of the triangular-shaped base, can be rotated by the user down such that it extends horizontally on a plane with the vehicle sun-visor, and up to a vertical position where it lies against the front face of the triangular-shaped base. This enables a user of any size, sitting in any seat position, to rotate the mirror to an appropriate position for close observation and examination of the eyes. The user can observe and examine the eyes from a sitting position with minimum effort, and immediately, without having to extract the mirror from a stored position. Once the mirror is adjusted for a given person in a given seat position, the mirror can be used repeatedly without further adjustment or movement. Moreover, the mirror is used without the sun-visor obstructing any portion of the view through the windshield.

In one preferred embodiment, the lamps attached at each side of the mirror are affixed to the sides of the triangular-shaped base, and do not rotate as the mirror is rotated. In this embodiment, the mirror and the light which is emitted from the lamps can be positioned independent of one another. The light is positioned by rotating the sun-visor, and the mirror is positioned by rotating the hinge which is attached to the base. According to this embodiment, the user can direct the light differently from the mirror and so aim the light somewhat above, or somewhat below, the level of the user's eyes.

In another embodiment, the lamps are equipped with rheostat loaded switches which allow the lamps to function with variable strength. The user can thus choose the amount and intensity of light to be emitted from the lamps as may be appropriate to the ambient light conditions and the user's needs.

While this portable device for observing and examining the eyes is designed primarily for use by drivers and front seat passengers of motor vehicles, its portable and detachable features make it suitable for use in almost any circumstance. The device can be used in other parts of motor vehicles, in the out-of-doors, at home, or in the office, as well as many other places.

Further objects and advantages of this invention will become apparent from consideration of the drawing and ensuing description.

BRIEF DESCRIPTION OF THE DRAWINGS

The details of typical, but not limiting, embodiments of the present invention will be described in connection with the accompanying drawings.

Figure 1:
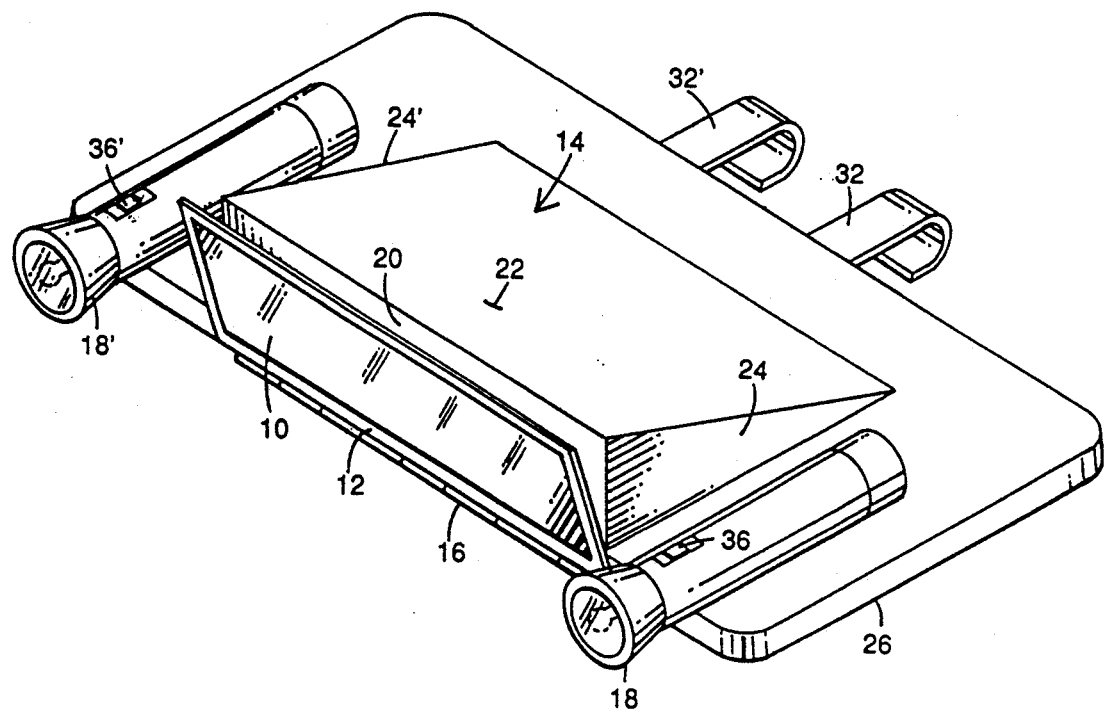
FIG. 1 is a perspective view of the portable device for observing and examining the eyes.

REFERENCE NUMERALS IN DRAWINGS 10 mirror
14 triangular-shaped base
18 lamp
22 top face of base 26 bottom face of base
30 vehicle ceiling
34 sun-visor edge
12 mirror frame
16 hinge
20 front face of base
24 side faces of base
28 sun-visor
32 U-shaped clips
36 switch

DETAILED DESCRIPTION OF PREFERRED EMBODIMENTS

FIG. 1 illustrates in perspective view the major elements of the invention, a portable device for observing and examining the eyes, consisting of a mirror 10 inside a mirror frame 12, joined to a triangular-shaped base 14 by a hinge 16. On each side of mirror 10 are mounted the lamps 18 and 18'.

Triangular-shaped base 14 has a front face 20, a top face 22, two side faces 24 and 24', and a bottom face 26. Hinge 16 attaches to bottom edge of mirror frame 12 to the edge of base 14 formed by the intersection of front face 20 and bottom face 26. Hinge 16 allows mirror 10 to be rotated from a position whereby it extends horizontally from bottom face 26, ninety degrees upwards, to a position whereby it is perpendicular to bottom face 26 and directly adjacent to front face 20.

Figure 2:
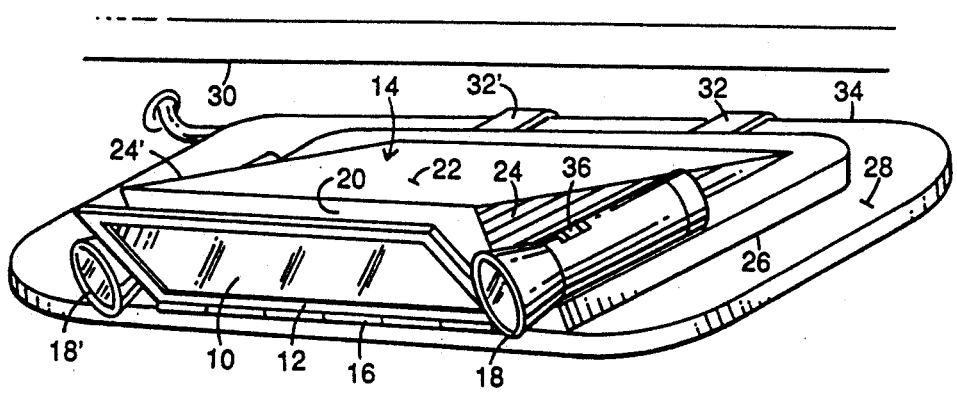
FIG. 2 is a perspective view of the invention mounted on a sun-visor inside an automobile.

Referring now to FIG. 2, the portable mirror device is depicted in perspective view mounted for use inside a motor vehicle. Bottom face 26 of base 14 lies on top of a horizontally extended sun-visor 28, causing base 14 to occupy the space inside the vehicle between sun-visor 28 and the vehicle ceiling 30. Base 14 is secured to sun-visor 28 using the U-shaped clips 32 and 32'. Clips 32 and 32' are affixed to bottom face 26 of base 14 by adhering a top arm of each clip 32 and 32' to bottom face 26 such that the clip arms extend towards hinge 16 and the clip curvature extends away from hinge 16 and lies just below and beyond the edge formed by the intersection of bottom face 26 and top face 22 of base 14. Base 14 is then secured to sun-visor 28 by sliding clips 32 and 32' around the sun-visor edge 34 of sun-visor 28 until base 14 is held snugly in place on top of sun-visor 28.

Figure 3:
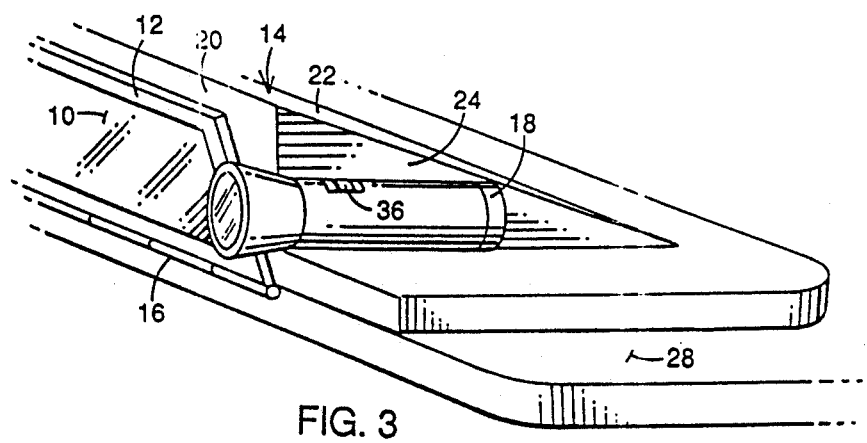
FIGS. 3 and 4 are perspective views of one preferred embodiment of the invention wherein the lamps are secured to the triangular-shaped base on either side of the mirror.
Figure 4:
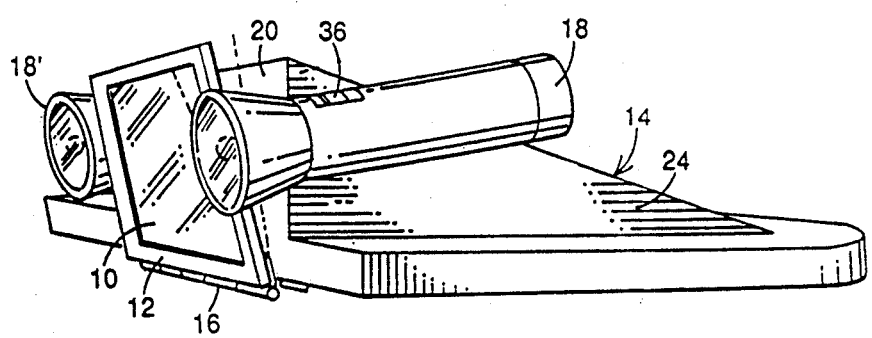

One preferred embodiment of the invention is illustrated in perspective view FIGS. 3 and 4. According to this embodiment, lamps 18 and 18' are mounted on each side of mirror 10 by attaching them to side face 24 and 24'. This permits mirror 10 to rotate about hinge 16 independent of lamps 18 and 18' and, in turn, allows the user to direct the light being emitted from lamps 18 and 18' differently from the light being reflected by mirror 10. The user aims the light being emitted from lamps 18 and 18' by rotating sun-visor 28, while the user aims the light being reflected by mirror 10 by rotating mirror 10 about hinge 16. Consequently, this embodiment permits the user to direct the light from lamps 18 and 18' either above or below user's eye level when user is looking at his or herself in mirror 10.

Figure 5:
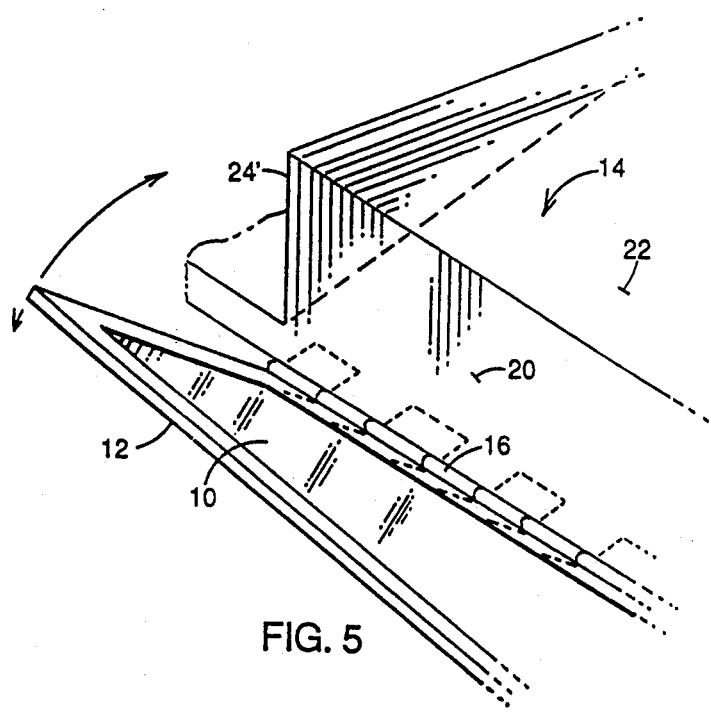
FIG. 5 is an enlarged fragmentary perspective view of the hinge element attaching the mirror to the device base.

FIG. 5 illustrates an enlarged fragmentary view of hinge 16 showing one arm of hinge 16 affixed to the bottom of mirror frame 12 and the second arm of hinge 16 affixed to the forward portion of bottom face 26 of base 14 adjacent to the edge of base 14 that is formed by the intersection of front face 20 and bottom face 26. While the second arm of hinge 16 is affixed to the bottom face 26 of base 14, it should be obvious to those skilled in the art that the second arm of hinge 16 can as well be affixed to front face 20 of base 14.

Figure 6:
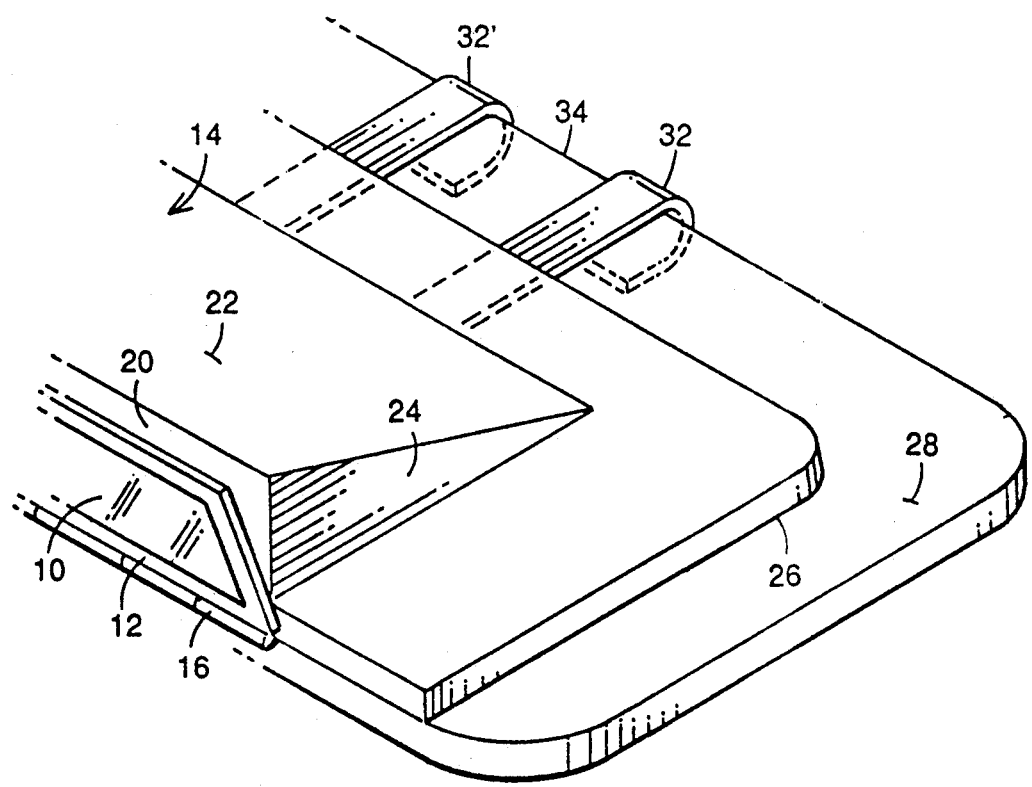
FIG. 6 is an enlarged fragmentary perspective view of the U shaped clips which hold the device to a vehicle sun-visor.

FIG. 6 illustrates an enlarged fragmentary view of U-shaped clips 32 and 32' securing base 14 to sun-visor 28. As can be seen, each top arm of clips 32 and 32' lies along and is adhered to bottom face 26 of base 14. The clip arms extend away from the windshield edge 34 of sun-visor 28, and the curved portion of clips 32 and 32'extend in the opposition direction to lie just below and beyond the edge of base 14 formed by the intersection of top face 22 and bottom face 26. While FIG. 5 illustrates the portable mirror device having two clips 32 and 32', the device can also be designed with one clip 32 or a plurality of clips 32. The portable mirror device of this invention can alternatively be secured to the top of a horizontally extended sun-visor, either permanently or detachably, by a variety of other known and well understood methods.

An enlarged fragmentary view of a further preferred embodiment which employ lamps that emit variable amounts of light is illustrated in FIG. 6. Lamp 18 has a switch 36 which is attached to a rheostat capable of varying the amount of power flowing to the lamp and, therefore, the intensity and amount of light emitted by the lamp. Although the illustrated switch 36 is a button which incrementally increases the amount of power flowing to the lamp each time it is depressed, a twist type rheostat loaded dimmer switch would be equally suitable.

Figure 7:
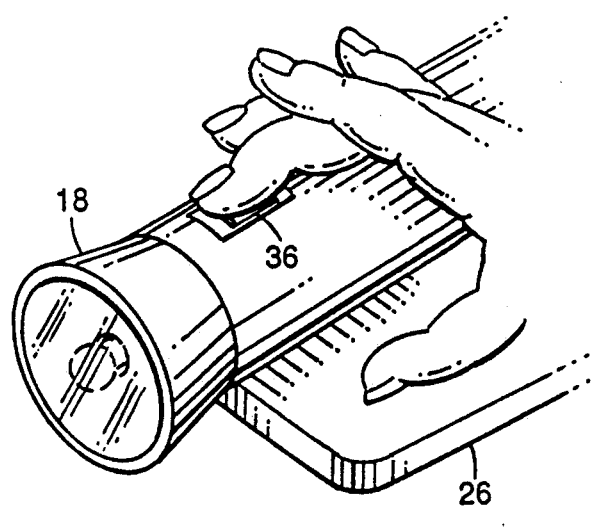
FIG. 7 is an enlarged fragmentary perspective view of an illuminating lamp equipped with a rheostat loaded switch capable of varying the intensity of light emitted from the lamp.

FIG. 7 depicts switch 36 controlling lamp 18. According to this embodiment lamp 18', not shown, would have its own rheostat loaded switch. This embodiment permits the amounts of light being emitted from lamps 18 and 18' to be controlled independent of one another and, consequently, allows user to illuminate the right side of his or her face to a greater extent than the left, or vise versa. Other embodiments could employ a central rheostat loaded switch controlling both lamps 18 and 18' together, ensuring thereby that each lamp emits an equal amount of light and that both sides of the user's face will be similarly illuminated.

SUMMARY AND SCOPE

Thus as is readily seen this portable mirror device, when mounted by placing base 14 on top of horizontally extended sun-visor 28, is immediately available for easy use by the driver or forward seat passenger for observing and examining one'eyes. There is not wasted effort, time or movement in extracting mirror 10 from a stored position, and the mirror device is out of the way such that it neither interfere's with the occupant's movements nor obstructs any views through the vehicle windshield or windows. Because mirror 10 is hingeably mounted to base 14, a user of any size and stature occupying any seat position can adjust the mirror assembly for precise and close examination of the eyes. Once adjusted, further use of the mirror requires no further time or effort. Lamps 18 and 18', mounted at each side of mirror 10, serves to illuminate the users eyes. When mounted on base 14, lamps 18 can be directed independent of mirror 10. Because lamps 18 are equipped with rheostat loaded switch 36, the amount and intensity of light being emitted can be varied to fit the ambient light conditions and the user's needs.

Although the present invention has been described and illustrated in connection with a number of preferred embodiments, it is understood that modifications and variations may be resorted to without departing from the spirit of the invention, as those skilled in the art will readily understand. Such modifications and variations are considered to be within the purview and scope of the present invention as defined in the appended claims and their legal equivalents.

I claim:

1. A portable device for observing and examining one's eyes comprising:
   (a) a triangular-shaped base sized to occupy the space between a horizontally extended automobile sun-visor and automobile ceiling;
   (b) a mirror the bottom of which is hingeably attached to the bottom front edge of said base and is rotatable about said base; and
   (c) lamps mounted at each side of said mirror which emit light in the same direction as the light being reflected by said mirror.

2. A portable device for observing and examining one's eyes according to claim 1 further comprising:
   (a) a motor vehicle;
   (b) a motor vehicle sun-visor;
   (c) wherein said sun-visor is affixed inside said motor vehicle above the vehicle windshield and said base is removably mounted on the top of said sun-visor.

3. A portable device for observing and examining one's eyes according to claim 2 wherein said hingeably attached mirror can be rotated by the occupant of said vehicle for immediate use with minimum effort and without obstruction of the user's view through the vehicle windows.

4. A portable device for observing and examining one's eyes according to claim 3 wherein said base is secured to the top of said sun-visor by means of a plurality of U-shaped clips affixed to the bottom face of said base which clips are slipped around the windshield edge of said sun-visor.

5. A portable device for observing and examining one's eyes according to claim 1 wherein said lamps are mounted at each side of said mirror by affixing said lamps to the side faces of said triangular-shaped base such that the light being emitted from said lamps may be directed independent of the light being reflected by said mirror.

6. A portable device for observing and examining one's eyes according to claim 2 wherein said lamps are mounted at each side of said mirror by affixing said lamps to the side faces of said triangular-shaped base such that the light being emitted from said lamps may be directed independent of the light being reflected by said mirror.

7. A portable device for observing and examining one's eyes according to claim 3 wherein said lamps are mounted at each side of said mirror by affixing said lamps to the side faces of said triangular-shaped base such that the light being emitted from said lamps may be directed independent of the light being reflected by said mirror.

8. A portable device for observing and examining one's eyes according to claim 1 wherein said lamps are controlled with a rheostat loaded switch capable of varying the intensity and amount of light being emitted by said lamps.

9. A portable device for observing and examining one's eyes according to claim 2 wherein said lamps are controlled with a rheostat loaded switch capable of varying the intensity and amount of light being emitted by said lamps.

10. A portable device for observing and examining one's eyes according to claim 3 wherein said lamps are controlled with a rheostat loaded switch capable of varying the intensity and amount of light being emitted by said lamps.

11. A portable device for observing and examining one's eyes according to claim 1 wherein each said lamp is equipped with a rheostat loaded switch whereby the intensity and amount of light being emitted by each lamp can be independently varied.

12. A portable device for observing and examining one's eyes according to claim 2 wherein each said lamp is equipped with a rheostat loaded switch whereby the intensity and amount of light being emitted by each lamp can be independently varied.

13. A portable device for observing and examining one's eyes according to claim 3 wherein each said lamp is equipped with a rheostat loaded switch whereby the intensity and amount of light being emitted by each lamp can be independently varied.

14. A portable device for observing and examining one's eyes comprising a motor vehicle, a motor vehicle sun-visor affixed inside said vehicle above the vehicle windshield, a triangular-shaped base removably mounted on the top of said sun-visor and sized to occupy the space between said sun-visor and vehicle ceiling when the sun-visor is extended horizontally, a mirror the bottom of which is hingeably attached to the bottom front edge of said base and is rotatable about said base, and two lamps each mounted at one side of said mirror.

15. A portable device for observing and examining one's eyes according to claim 14 wherein said lamps are affixed to the side faces of said triangular-shaped base such that the light being emitted from said lamps may be directed independent of the light being reflected by said mirror.

16. A portable device for observing and examining one's eyes according to claim 14 wherein the lamps are supplied with rheostat loaded switches to vary the intensity and amount of light being emitted therefrom.

* * * * *